United States Patent
Willson et al.

(10) Patent No.: US 11,169,902 B2
(45) Date of Patent: *Nov. 9, 2021

(54) TECHNIQUES FOR EVALUATING COLLECTED BUILD METRICS DURING A SOFTWARE BUILD PROCESS

(71) Applicant: INTUIT INC., Mountain View, CA (US)

(72) Inventors: Michael Willson, Mountain View, CA (US); Velu Ganapathy, Mountain View, CA (US)

(73) Assignee: INTUIT, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/855,278

(22) Filed: Apr. 22, 2020

(65) Prior Publication Data

US 2020/0250070 A1 Aug. 6, 2020

Related U.S. Application Data

(63) Continuation of application No. 15/192,392, filed on Jun. 24, 2016, now Pat. No. 10,671,510.

(51) Int. Cl.
| | | |
|---|---|---|
| *G06F 11/36* | (2006.01) |
| *G06F 8/77* | (2018.01) |
| *G06F 8/71* | (2018.01) |
| *G06F 8/70* | (2018.01) |
| *G06F 11/34* | (2006.01) |
| *G06Q 10/06* | (2012.01) |

(52) U.S. Cl.
CPC ............ *G06F 11/3604* (2013.01); *G06F 8/77* (2013.01); *G06F 11/3688* (2013.01); *G06F 11/3692* (2013.01); *G06F 8/70* (2013.01); *G06F 8/71* (2013.01); *G06F 11/34* (2013.01); *G06Q 10/06* (2013.01)

(58) Field of Classification Search
None
See application file for complete search history.

(56) References Cited

U.S. PATENT DOCUMENTS

| | | |
|---|---|---|
| 7,437,712 B1 | 10/2008 | Brown et al. |
| 7,653,893 B2 | 1/2010 | Neumann et al. |

(Continued)

OTHER PUBLICATIONS https://medium.com/@ericclemmons/javascript-fatigue-48d4011b6fc4#.5rvwime5v.

(Continued)

*Primary Examiner* — Lewis A Bullock, Jr.
*Assistant Examiner* — Gilles R Kepnang
(74) *Attorney, Agent, or Firm* — Patterson + Sheridan, LLP

(57) ABSTRACT

Techniques are disclosed for enforcing build policies for a software development project of a software platform. Metrics are collected during a stage in a build process for the software development project. The metrics are collected via a build module for building a software development project. The build module is common to software development projects of the software platform. Each of the metrics is evaluated against a plurality of policies. Each policy specifies one or more rules for whether to allow the build process to proceed. Upon determining that one of the metrics does not comply with at least one of a plurality of policies, the build process is aborted at the stage.

20 Claims, 7 Drawing Sheets

(56) References Cited

U.S. PATENT DOCUMENTS

| | | | |
|---|---|---|---|
| 8,381,176 B1* | 2/2013 | Bentley | G06F 8/71 717/107 |
| 8,522,207 B1* | 8/2013 | Whittington | G06F 8/433 717/122 |
| 8,661,412 B2 | 2/2014 | Salloum et al. | |
| 8,924,925 B2 | 12/2014 | Englehart | |
| 9,009,649 B2 | 4/2015 | Grechanik et al. | |
| 9,135,591 B1 | 9/2015 | Nicol et al. | |
| 9,606,900 B1* | 3/2017 | Pradhan | G06F 8/70 |
| 2004/0002105 A1 | 2/2004 | Nielson et al. | |
| 2004/0001681 A1 | 8/2004 | Kramer | |
| 2004/0168152 A1* | 8/2004 | Kramer | G06F 8/71 717/120 |
| 2007/0000060 A1 | 1/2007 | Brunswig et al. | |
| 2007/0001629 A1 | 7/2007 | Kimmerly | |
| 2007/0168974 A1* | 7/2007 | Mockford | G06F 8/71 717/124 |
| 2008/0000338 A1 | 2/2008 | Rehrauer et al. | |
| 2008/0052666 A1* | 2/2008 | Lim | G06F 8/71 717/106 |
| 2009/0138898 A1* | 5/2009 | Grechanik | G06F 8/36 719/328 |
| 2011/0000230 A1 | 1/2011 | Chumbley et al. | |
| 2011/0001457 A1 | 6/2011 | Alexander et al. | |
| 2011/0219146 A1* | 9/2011 | Jacobson | G06F 9/44505 710/8 |
| 2012/0001313 A1 | 5/2012 | Salloum et al. | |
| 2013/0074038 A1* | 3/2013 | Fox | G06F 8/70 717/122 |
| 2013/0000865 A1 | 4/2013 | Grechanik | |
| 2013/0086553 A1* | 4/2013 | Grechanik | G06F 8/70 717/123 |
| 2013/0212562 A1* | 8/2013 | Fox | G06F 8/70 717/120 |
| 2014/0002823 A1 | 9/2014 | Jubran et al. | |
| 2014/0002824 A1 | 9/2014 | Drost et al. | |
| 2014/0002896 A1 | 9/2014 | Wenda et al. | |
| 2014/0282353 A1* | 9/2014 | Jubran | G06F 8/00 717/101 |
| 2014/0282450 A1* | 9/2014 | Jubran | G06F 8/443 717/151 |
| 2015/0001009 A1 | 4/2015 | Nadar et al. | |
| 2015/0100945 A1* | 4/2015 | Nadar | G06F 8/40 717/121 |
| 2015/0128112 A1* | 5/2015 | Choi | G06F 8/61 717/140 |
| 2015/0001862 A1 | 7/2015 | Abraham et al. | |
| 2015/0002056 A1 | 7/2015 | Grillo et al. | |
| 2015/0199188 A1* | 7/2015 | Mantripragada | G06F 8/60 717/101 |
| 2015/0220426 A1* | 8/2015 | Spektor | G06F 8/71 717/131 |
| 2016/0042191 A1* | 2/2016 | Enck | G06F 21/6218 726/1 |
| 2016/0001475 A1 | 5/2016 | Coleman et al. | |
| 2016/0147529 A1* | 5/2016 | Coleman | G06F 8/63 717/120 |
| 2017/0147338 A1* | 5/2017 | Jackson | G06F 11/36 |

OTHER PUBLICATIONS https://engineering.linkedin.com/blog/2016/01/smashing-the-monolith.

Berglund, Tim. "Gradle: Beyond the Basics". Jul. 15, 2013. O'Reilly. Chapter 3 Build Hooks. (Year:2013).

Zibran, Minhaz F., Farjana Z. Eishita, and Chanchai K. Roy. "Useful, but usabale? factors affecting the usabiity of APIs." Oct. 2011. 18th Working Conference on Reverse Engineering IEEE (Year:2011).

* cited by examiner

TECHNIQUES FOR EVALUATING COLLECTED BUILD METRICS DURING A SOFTWARE BUILD PROCESS

CROSS-REFERENCE TO RELATED APPLICATIONS

This Application is a continuation of co-pending U.S. patent application Ser. No. 15/192,392, filed Jun. 24, 2016, the contents of which are incorporated herein in their entirety.

BACKGROUND

Field

Embodiments presented herein generally relate to software development, and more specifically, to enforcing policies on a software build based on metrics collected via a build module shared across a variety of applications.

Description of the Related Art

A technology enterprise may employ a number of teams to develop software for the enterprise. For example, software development teams may create applications for a software platform maintained by an infrastructure manager of the enterprise. In addition, the platform may allow third-party developers to create applications for support. In such a platform, developers may create their own sets of scripts needed for building an application project (e.g., for running servers to host the build, performing build tests, generating reports of the test results, creating build artifacts, and the like). Doing so affords independence to a developer in maintaining build code for each distinct project.

However, this approach also creates a significant amount of code duplication across the projects, which may lead to inefficient use of developer time. Further, build code is typically linked to a version of the software platform. Consequently, changes to the software platform may require modifications by the developer to the build code itself. Further still, developers may be unaware of which updates to the platform (e.g., bug fixes, improvements, etc.) can be leveraged when modifying build code, resulting in a gradual decay of the build code as build dependencies change with the platform.

In addition, the infrastructure manager may want to exercise quality control over development projects for the software platform. Doing so provides a measure of consistency for each application associated with the software platform. For example, the infrastructure manager may want to minimize reliance on legacy code used in applications deployed by development teams. As another example, the infrastructure manager may also want to ensure that build tests include certain test cases. However, because the volume of application projects in an enterprise can be relatively high, tracking such data presents a challenge.

SUMMARY

One embodiment presented herein discloses a method for enforcing build policies for a software development project. This method generally includes collecting, via a processor, a plurality of metrics during a stage in a build process for a software development project in a software platform. The plurality of metrics is collected via a build module for building a software development project. The build module is common to a plurality of software development projects including the software development project. Each of the metrics is evaluated against a plurality of policies. Each policy specifies one or more rules for whether to allow the build process to proceed. Upon determining that one of the metrics does not comply with at least one of a plurality of policies, the build process is aborted at the stage.

Another embodiment discloses a computer-readable storage medium storing instructions, which, when executed on a processor, performs an operation for enforcing build policies for a software development project. The operation itself generally includes collecting, via a processor, a plurality of metrics during a stage in a build process for a software development project in a software platform. The plurality of metrics is collected via a build module for building a software development project. The build module is common to a plurality of software development projects including the software development project. Each of the metrics is evaluated against a plurality of policies. Each policy specifies one or more rules for whether to allow the build process to proceed. Upon determining that one of the metrics does not comply with at least one of a plurality of policies, the build process is aborted at the stage.

Yet another embodiment discloses a system having a processor and a memory storing a program, which, when executed on the processor, performs an operation for enforcing build policies for a software development project. The operation itself generally includes collecting, via a processor, a plurality of metrics during a stage in a build process for a software development project in a software platform. The plurality of metrics is collected via a build module for building a software development project. The build module is common to a plurality of software development projects including the software development project. Each of the metrics is evaluated against a plurality of policies. Each policy specifies one or more rules for whether to allow the build process to proceed. Upon determining that one of the metrics does not comply with at least one of a plurality of policies, the build process is aborted at the stage.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
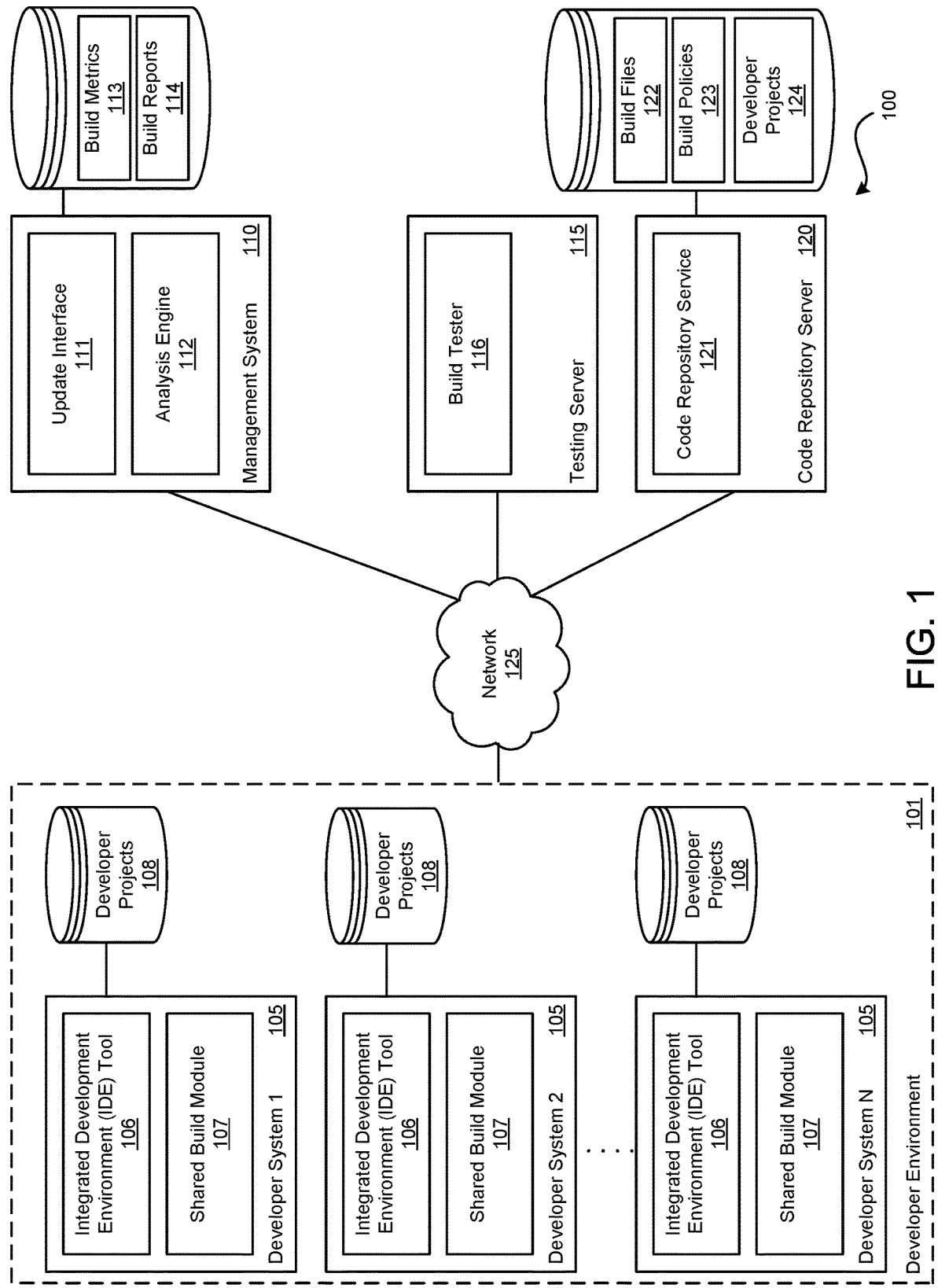
FIG. 1 illustrates an example computing environment, according to one embodiment.

Embodiments presented herein disclose techniques for enforcing software build policies via a build module that is shared across multiple developer application projects, e.g., for a given software platform maintained by an enterprise. In one embodiment, a developer system configures a shared build module for a given developer project. The shared build module centralizes build code such that each developer project does not require its own set of build code. That is, the shared build module includes common build code and libraries specific to the software platform. The common build code may include features such as server configuration, source code compilation, automated build testing, and deployment. Further, the shared build module may be hosted in a common code repository for retrieval by developer systems. Further, because the build module is hosted in a single repository (rather than inside repositories each corresponding to an individual developer project), an infrastructure manager can better maintain updates for the platform and to build code that needs to be modified as a result of the updates. Effectively, the shared build module removes the need for developers to write separate build code and instead centralizes the build code into a common module used by each of the developers.

In one embodiment, the shared build module collects metric information from each developer project at build time. For example, when a developer system executes the shared build module, the shared build module may evaluate project source code to determine which application programming interfaces (APIs) are used, ratios of comments to written code, and the like. Further, the shared build module may collect metrics obtained from automated build test workflows. In particular, the shared build module includes build code for performing automated tests, such as unit testing, graphical user interface (GUI) testing, and API-driven testing, on a temporary build of the developer project. While each test is executed, the shared build module may monitor the execution of the test for specified data. For example, for a given project, the shared build module may evaluate code coverage in an execution of various build tests to confirm which lines of code are actually executed. As another example, the shared build module may evaluate image formats used in a GUI interface for the build. As yet another example, the shared build module may evaluate code syntax and adherence to style practice (e.g., of the software development environment). Generally, the shared build module may move, create, aggregate, or modify files (e.g., developer source code, libraries, executables, etc.) when collecting the metrics.

In one embodiment, an analysis engine executing on a centralized management system for the software platform may aggregate the metrics collected in each build. Doing so allows the analysis engine to correlate the build metrics of a given developer project with build metrics of another project (or group of projects). For example, the analysis engine may identify trends in code practice by various software development teams, such as APIs used by developers, an average rate of code coverage, deviations in rates of code coverage, and the like. Other examples include identifying trends in syntax use, API usage, and code style.

Such metrics may be beneficial for an infrastructure team to review to better manage development teams creating applications on the software platform. In one embodiment, the shared build module may enforce policies defined based on metrics collected during the various stages of the build process. For example, as stated, the shared build module may collect build metrics relating to source code of a developer project, e.g., a percentage of code with adequate comment description to code without comment description. An infrastructure manager may define a build policy that requires developer projects meet at least a threshold percentage with regard to such metrics, e.g., 85%. In the event that a build metric captured for the project falls below the threshold, the shared build module may block the completion of the build. As another example, the shared build module may enforce build policies based on criteria set for one or more of the collected build metrics. For instance, the shared build module may abort a build process in cases where a given metrics fall below the criteria. For example, the shared build module may abort the build process if a metric measuring code coverage for a build falls below an percentage specified by the policies, e.g., 80%, 85%, etc.

Embodiments presented herein describe enforcing build policies based on metrics collected from a build module that is common a wide variety of developer projects. Advantageously, this approach provides a consistent solution for collecting and analyzing metrics across a diverse set of software builds for a given platform. Further, this approach allows an infrastructure manager to enforce quality control over numerous developer projects at each stage of a build based on the metrics collected for each project, such as during pre-build (e.g., by evaluating developer source code) and during automated testing of the build.

FIG. 1 illustrates an example computing environment 100 for developing applications for a software platform, according to one embodiment. As shown, computing environment 100 includes a developer environment 101, a management system 110, a testing server 115, and a code repository server 120, each interconnected via a network 125 (e.g., representative of a local area network, a wide area network, the Internet, etc.).

In one embodiment, the developer environment 101 includes multiple developer systems 1-N 105. Each developer system 105 generally includes an integrated development environment (IDE) tool 106 and a shared build module 107. Generally, the IDE tool 106 includes an editing interface and an interface to invoke the shared build module 107 one of the developer projects 108. The editing interface generally provides a graphical interface that allows software developers to access, create, edit, and test source code components in a development project. Source code components include source code files, modules, functions, libraries, or portions thereof that can be viewed and/or edited in IDE tool 106. For a given developer project 108, a developer may, in some cases, obtain source code files to edit from a networked data store, such as a code repository service 121 executing on the code repository server 120 that provides access to a corresponding developer project 124. As developers write and test code, developers can commit new source code files and modifications to existing source code files to the repository.

In some cases, the IDE tool 106 may additionally provide an interface in which developers can edit a configuration file used by shared build module 107 to build and/or deploy a given developer project 108. A developer can retrieve the configuration file, for example, from a local data store or from build configuration in build files 122 in the data store of the code repository server 120. The configuration file may be, for example, a text file that the shared build module 107 can parse to determine whether optional features provided by the shared build module are to be used in building and deploying the underlying application being developed on developer system 105. In some cases, developer system 105 may provide a graphical interface that presents each of the optional features provided by the shared build module to a developer and graphical user interface (GUI) components (e.g., radio buttons, on/off toggles, check boxes, and so on) that a developer can use to activate or deactivate optional features.

IDE tool 106 additionally may provide a debugging interface in which developers can test code before building a version of a development project for release (e.g., as an internal test version, private beta version, or a public release). The debugging interface may allow developers to compile a temporary build of a development project and upload the project to a testing server 115. A build tester 116 hosted on the testing server 115 may execute the temporary build of the development project. To aid in debugging the development project, the debugging interface in IDE tool 106 generally allows developers to set breakpoints in various locations in the source code components of a development project to temporarily halt execution of the program. The debug environment may also present one or more graphical interfaces to display the values and states of variables in an executing subroutine or method, stack traces illustrating the program execution path that resulted in execution of a particular line of code, and so on.

In one embodiment, the IDE tool 106 obtains a shared build module from the code repository service 121 to use in building and deploying a developer project 108. Generally, when a developer invokes shared build module 107 (e.g., via the IDE tool 106, a command line tool, and so on), the shared build module 107 may download a copy of the shared build module to the developer system 105 (if a local copy does not exist or is out-of-date) and begin a shared build process according to the configuration file for the development project. In some cases, the IDE tool 106 retrieves the shared build module from code repository service 121 using a package manager (e.g., npm).

The shared build module 107 generally includes scripts, utilities, and configurations that may be common to many application development teams. For example, the shared build module 107 may include scripts for building (e.g., compiling and linking) a developer project 108, configuring test servers (e.g., for debug purposes), executing tests on the compiled developer project 108 (e.g., unit testing), and so on. The scripts included for executing tests on the compiled development project may include, for example, scripts to measure the amount of code in the development project that is covered during unit testing.

In one embodiment, the shared build module 107 collects metrics at various stages of a build process for a given developer project 108. For instance, the shared build module 107 may calculate an amount of code covered by unit tests to determine if the developer project 108 is sufficiently tested. The shared build module 107, in some cases, may define a minimum level of code coverage. If the amount of code coverage for the software development project exceeds the minimum level of coverage, scripts in the shared build module may allow IDE tool 106 to build and deploy the developer project 108. If the amount of code coverage for the software development project is less than the specified minimum level of coverage, scripts in the shared build module 107 may notify a developer that the amount of code coverage is less than the specified minimum. In some cases, scripts in the shared build module may compile the software development project for testing, but may block developers from deploying the software development project to a production environment until the amount of code tested on developer system 105 exceeds the specified minimum.

In one embodiment, the management system 110 includes an update interface 111 and an analysis engine 112. The update interface 111 generally allows developers of the shared build module to commit updates to the shared build module through the code repository service 121 (e.g., as developer projects 124).

In one embodiment, the analysis engine 112 collects build metrics 113 from various developer projects 108 (e.g., from shared build module 107 at the developer systems 105). Build metrics 113 for a given development project 108 may identify, for example, API functions invoked by the build, shared build module functions invoked during build/deployment operations, errors encountered while compiling or testing the build, and so on. Based on the build metrics 113 received from the various developer systems 105, analysis engine 112 can identify usage trends across the various development teams writing applications for the software platform. The usage trends may identify, for example, popular APIs, APIs that cause compilation and/or runtime errors, and so on. Based on the usage trends identified by analysis engine 112, developers supporting the shared build modules and/or the APIs targeted by developers can focus development efforts on optimizing popular APIs and fixing bugs in APIs that analysis engine 112 identifies as sources of a large number of build and/or runtime errors.

In one embodiment, the code repository service 121 generally maintains a repository in which development teams can store source code files, build configuration files, and so on. Illustratively, the data store includes build files 122 and build policies 123 packaged in the shared build module 107 and developer projects 124. The build files 122 generally include the build scripts, utilities and configuration files associated with each version of a shared build module. In one embodiment, build policies 123 include policies associated with each version of the shared build module maintained by the code repository service 121. For instance, an infrastructure manager for the software platform may define build policies 123 specifying thresholds for an amount of code test coverage and whether developers can deploy, to production systems, code that falls below the defined thresholds. Another build policy 123 may specify a blacklist of APIs or libraries that should not be used in project source code.

In one embodiment, the shared build module 107 may use the collected build metrics 113 of a given developer project 108 to prevent the developer from building and deploying the project. The shared build module 107 may do so at any stage of the build process.

For example, prior to entering a compilation stage of the build process, the shared build module 107 can scan the source code for a software development project to determine if the project source code includes calls to deprecated or legacy APIs or API functions. If the project source code does include calls to such APIs, the shared build module 107 can block (e.g., via an API hook) compilation of the source code, generate an error, and notify the user of developer system 105 that the project source code uses these APIs. In some cases, the shared build module 107 may block a development team from deploying a compiled version the development project 108 until the development team replaces the deprecated APIs or functions with supported APIs or functions.

As another example, during a testing stage of the build process, the shared build module 107 may evaluate metrics relating to build tests against the build policies 123. For instance, a build policy 123 may require a certain code coverage percentage be at least or above a threshold for the developer project 108 to be checked-in via the code repository service 121. In the event that the build falls below the specified percentage, the shared build module 107 may block the build from being checked-in via the code repository service 121.

Figure 2:
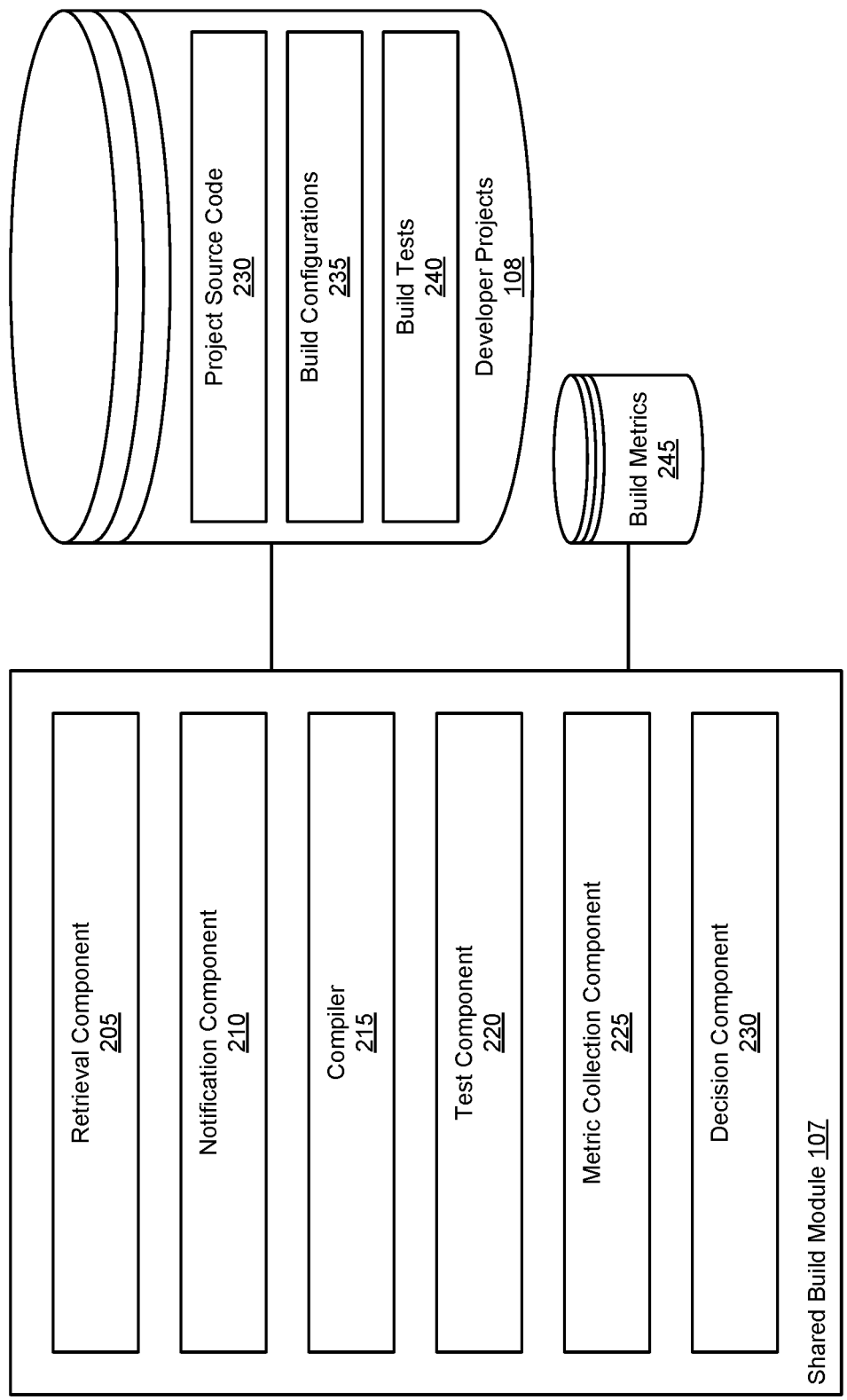
FIG. 2 further illustrates the shared build module and developer projects first described relative to FIG. 1, according to one embodiment.

FIG. 2 further illustrates an example shared build module 107 and example developer project 108, according to one embodiment. As shown, the shared build module 107 generally includes a retrieval component 205, a notification component 210, a compiler 215, a test component 220, a metric collection component 225, and a decision component 225. The developer project 108 includes project source code 230, build configurations 235, and build tests 240.

In one embodiment, the retrieval component 205 is generally configured to query the code repository service 121 for version information associated with the most recent version of the shared build module. If the retrieval component 205 determines that a stored version of the shared build module is older than the most recent version of the shared build module 107, the retrieval component 205 may determine whether to download the most recent version of the shared build module 107 based, for example, on whether the most recent version of the shared build module 107 is designated as a minor update, a major update, and/or a mandatory update.

In one embodiment, the notification component 210 is generally configured to display information about the shared build module 107 to a user of developer system 105 (e.g., as pop-up windows, e-mail notifications, and so on). The notification component 210 generally receives data to display from the retrieval component 205. The data to display may include, for example, expiration dates associated with a previous version of the shared build module 107, availability of an updated version of the shared build module 107, changes to the shared build module 107 relative to a previous version of the shared build module, and so on. As further described below, the notification component 210 may also present errors relating to blocked or failed builds as a result of collected metrics failing one of the build policies 123.

In one embodiment, the compiler 215 is generally configured to build the developer project 108 from the project source code 230 into executable code based on the build configurations 235. As discussed, the build configurations 235 are files used by the shared build module 107 to build and/or deploy the developer project 108, where the build configurations 235 specify features provided by the shared build module 107. In some cases, the compiler 215 may be configured to use a first set of build scripts to create a temporary build of the developer project 108 for debugging purposes, and a second set of build scripts to build the developer project 108 for public release.

In one embodiment, the build scripts used for debugging a software development project may include scripts for generating a temporary build of the developer project 108 with debug flags enabled (e.g., to allow a user to pause testing and perform line-by-line execution of the source code), generating a variety of build tests 240 against the code of the developer project 108, measuring an amount of code covered by the tests, and so on.

In one embodiment, the test component 220 manages the build tests 240 performed on the temporary build of the developer project 108. For instance, the test component 220 may execute build scripts used to generate the build tests 240. In addition, the test component 220 may upload the temporary build to the build tester 116, where in turn, the build tester executes the temporary build. The build tester 116 may return the results of the build tests 240 to the test component 220. In some cases, the test component 220 may execute the temporary build and perform the build tests 240 on the build.

In one embodiment, the metric collection component 225 captures build metrics 245 at each stage of a build process for the developer project 108. To do so, the metric collection component 225 may determine, based on the build configurations 235, which build metrics 245 to monitor and capture during the build phase. Examples of build metrics 245 include API usage (which APIs are used in the project source code 230), code coverage (a measure of how much project code is executed in the build tests 240), comment description coverage (a measure determining whether a line of code or code function has adequate code description), execution time for certain build tests 240, image formats used in GUIs of the underlying application, amount of debug issues raised, and the like.

Based on the specified build configurations 235, the metric collection component 225 may monitor each build stage and record the specified build metrics 245, e.g., in a text file or spreadsheet maintained in a local data store. For instance, at pre-build stage (e.g., once a developer requests to build the developer project 108 and before the compiler 215 creates a temporary build), the metric collection component 225 may scan the project source code 230 for APIs and API functions used in the source code and store the collected metrics locally.

The metric collection component 225 may then record the API names, line numbers associated with each API, and functions used as part of the API. As another example, during the compilation stage, the metric collection component 225 may collect warnings generated by the compiler 215. As yet another example, during the automated testing phase, the metric collection component 225 may record an amount of code coverage from the test cases 240 to determine whether the amount of test coverage meets or exceeds a threshold amount of code coverage defined in the shared build module. Other examples include commit timestamps, individual developer activity on a developer project 108 (e.g., most active developers on the project 108, last developer to edit the project 108, etc.), an identifier of an external build system building the project 108, a version of the shared build module 107 that built the project 108, and code complexity of the project 108.

In one embodiment, the decision component 230 receives metric and policy evaluation data (e.g., from the analysis engine 112 or the metric collection component 225). In one embodiment, the decision component 230 allows a build to complete (e.g., for check-in to the code repository service 121 or for deployment) or prevents the build from deploying, based on the evaluation. The decision component 230 may then block (e.g., via an API hook) the build from being deployed to the code repository. Further, the decision component 230 may direct the notification generator 220 to display a message on developer system 105 informing the user that the developer project 105 does not meet the required code coverage.

Further, the metric collection component 225 may send the collected metrics for the developer project 108 to the analysis engine 112. As stated, in one embodiment, the analysis engine 112 may aggregate the build metrics 245 of the developer project 108 with build metrics 113 collected from other developer projects 108. Doing so allows the analysis engine 112 to identify one or more correlations across the developer projects 108 for a metric (or group of metrics).

To do so, the analysis engine 112 may retrieve previously analyzed build metrics 113 from a data store and evaluate the build metrics 113 relative to the build metrics 245. The analysis engine 112 may then identify, e.g., deviations in the build metrics 245 from the build metrics 113, whether the build metrics 113 are within trends identified in the build metrics 245, a ranking of certain metrics of the developer project 108 relative to corresponding metrics in other developer projects 108, etc. Further, the analysis engine 112 may store the build metrics 245 in the data store and update any statistics relating to previously collected build metrics 245. For example, the analysis engine 112 may update an average code coverage measure across the build metrics 245.

As stated, in one embodiment, the analysis engine 112 also evaluates the collected metrics against the build policies 123 provided by the code repository service 121. The analysis engine 112 does so to determine whether each of the metrics conforms with the build policies 123. For example, a given build policy 123 may require that a code coverage for a development project 108 be over 85% in order to create a complete build of the development project 108. The build policy 123 may specify to fail build requests for developer projects 108 having code coverage metrics that do not comply with the policy. If the amount of code coverage does not meet the threshold amount of code coverage, the decision component 230 may receive an evaluation of the metric and relevant policy indicating that the build should be blocked. To do so, the decision component 225 may set API hooks in each of the build stages that allows the decision component 225 to block certain operations from proceeding (e.g., compilation of code, upload of a build package to the code repository service 121, etc.).

Figure 3:
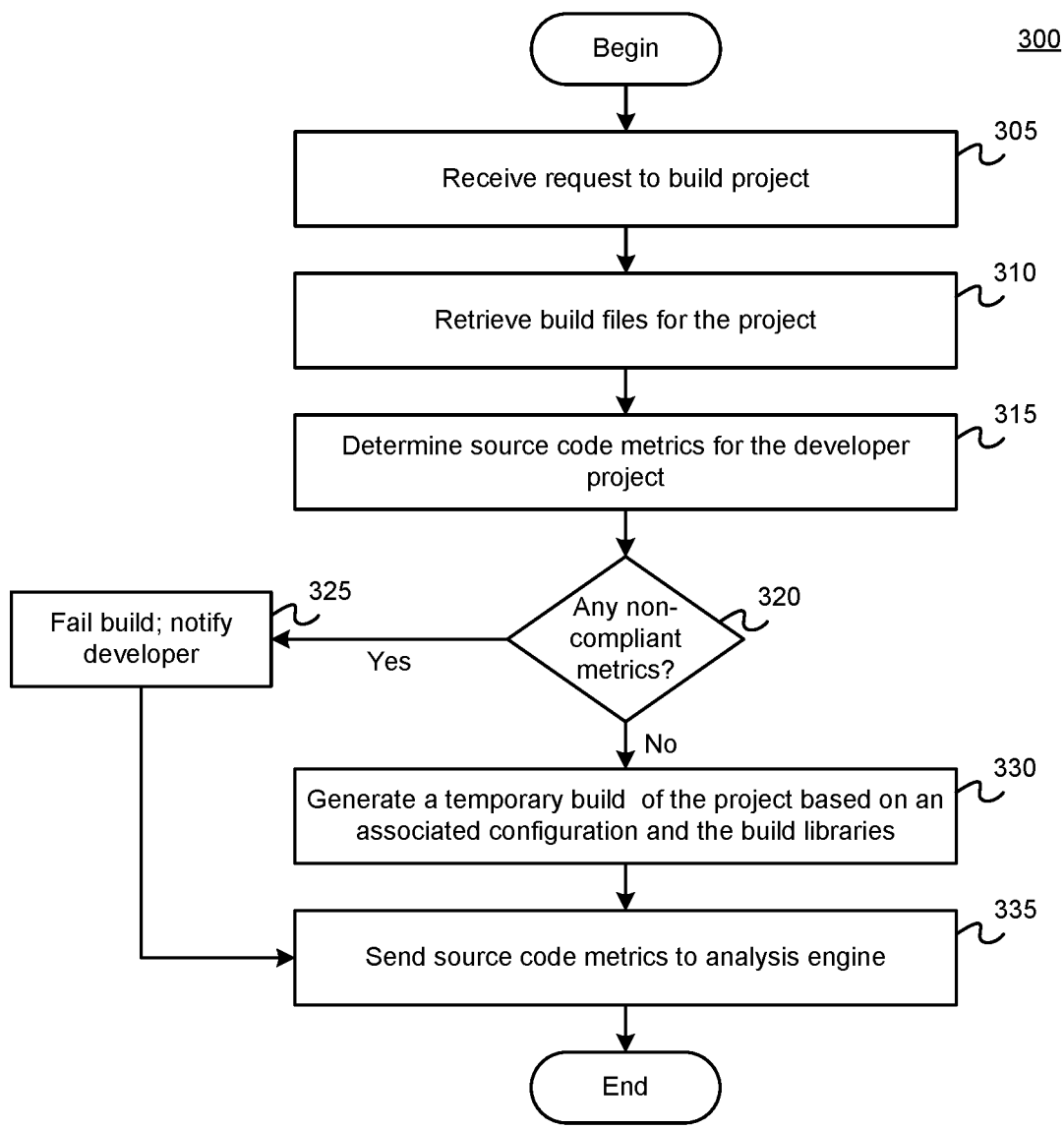
FIG. 3 illustrates a method for building a developer project using a shared build module, according to one embodiment.

FIG. 3 illustrates a method 300 for collecting build metrics at pre-build stage for a developer project 108 via the shared build module 107, according to one embodiment. As shown, the method 300 begins at step 305, where the retrieval component 205 receives a request to build a developer project 108. In turn, the retrieval component 305 may evaluate the build configuration 235 associated with the developer project 305 to determine features, test cases, etc. to include in the build. As stated, the build configuration 235 may include information defining which optional features of the shared build module 107 are to be invoked during the build process, which modules to use during the build process, and so on.

At step 310, the retrieval component 205 obtains build files 122 for the developer project 108 from the code repository service 121 based on the specified build configuration 235. At step 315, the metric collection component 225 captures source code metrics. To do so, the metric collection component 225 may retrieve each of the source code files and libraries associated with the developer project 108. The metric collection component 225 may then evaluate each source code file for each specified metric.

For example, the metric collection component 225 may identify names of APIs and API functions used in each source code file, a number of calls to a given API function, line counts, and the like. Further, the metric collection component 225 may send the source code metrics to the analysis engine 112. When doing so, the metric collection component 225 may generate an identifier to associate with the source code metrics, a timestamp, and a description of the metric obtained. This allows the analysis engine 112 to identify the metric for evaluation and reporting.

At step 320, the metric collection component 225 may determine whether any of the source code metrics does not comply with one or more of the build policies 123. For example, the metric collection component 225 may determine that a percentage of code comment descriptions in the project source code falls below a given threshold specifies in the policies 123. In turn, the metric collection component 225 may send an indication to the decision component 230 to prevent the build from proceeding to the next stage. In turn, at step 325, the decision component 230 fails the build. The decision component 230 may generate an error describing the failure. And the notification component 210 may send the error to the developer via the IDE tool 106.

Otherwise, at step 330, the compiler 215 generates a temporary build of the project based on an associated configuration and the build libraries. In addition, the compiler 215 may generate one or more test cases specified in the build configuration 235. Once generated, the test component 220 may send the temporary build and test cases to the build tester 116 to execute build tests, e.g., automated unit tests, GUI tests, etc. As stated, the metric collection component 225 obtains metrics associated with each of the tests executed on the temporary build. At step 335, the metric collection component 335 may send the obtained metrics to the analysis engine 112 for evaluation.

Figure 4:
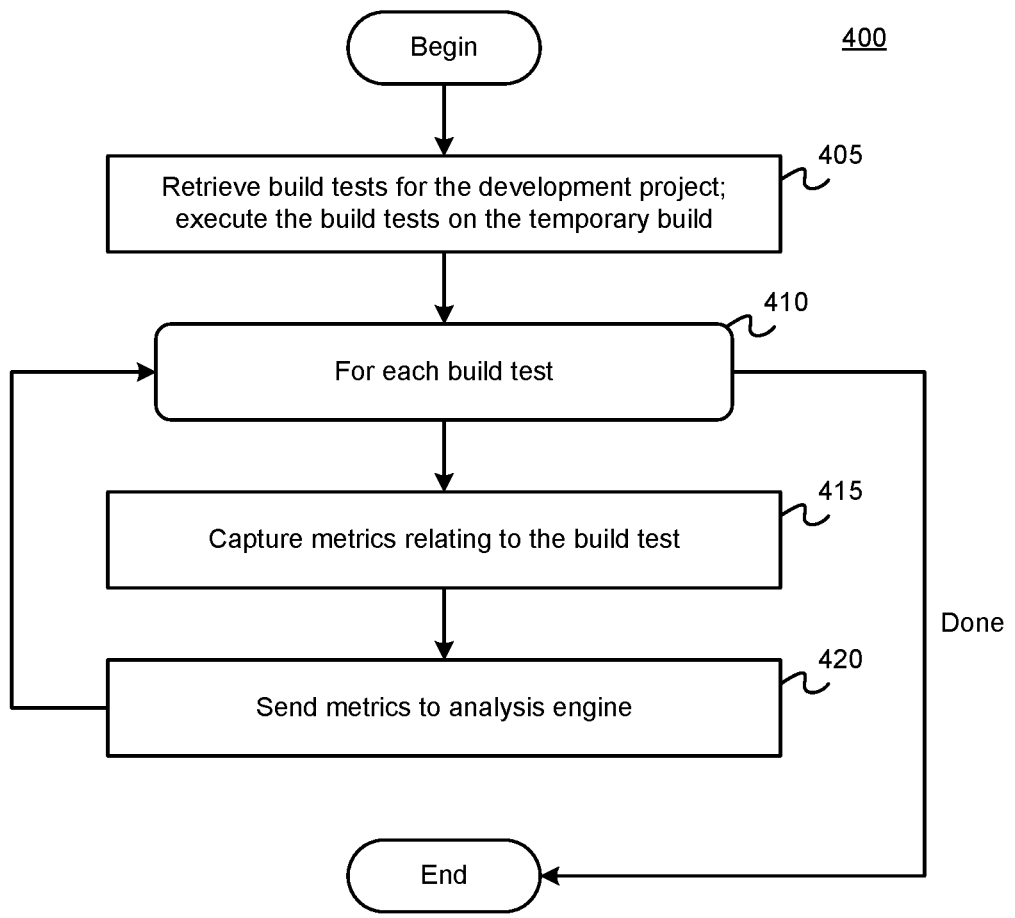
FIG. 4 illustrates a method for collecting build metrics for a developer application project, according to one embodiment.

FIG. 4 illustrates a method 400 for collecting metrics for a build of a developer project 108, according to one embodiment. In particular, method 400 provides an example describing obtaining metrics collected during an automated testing phase of the build process on a temporary build of the developer project 108. As shown, method 400 begins at step 405, where the test component 220 determines the build tests to perform on the temporary build, based on the build tests 240 specified in the build configuration 235. The test component 220 (or a build tester 116 executing on the testing server 115) performs each of the specified build test 240.

At step 410, the method 400 enters a loop for each build test 240 for steps 415 and 420. At step 415, the metric collection component 225 captures metrics relating to the build test 240. For example, for a build test 240 that measures code coverage of the build, the metric collection component 225 may retrieve data relating to the test, such as the code coverage measure, APIs executed during the code coverage test, and the like. In one embodiment, the build test 240 may be configured to send these metrics to the metric collection component 225.

At step 420, the metric collection component 225 sends the collected build metrics to the analysis engine 112. To do so, the metric collection component 225 generates an identifier to associate with the source code metrics, a timestamp, a build number, and a description of the metric obtained. This allows the analysis engine 112 to identify the metric for evaluation and reporting. Once the build tests 240 have completed executing, the method 400 ends.

Figure 5:
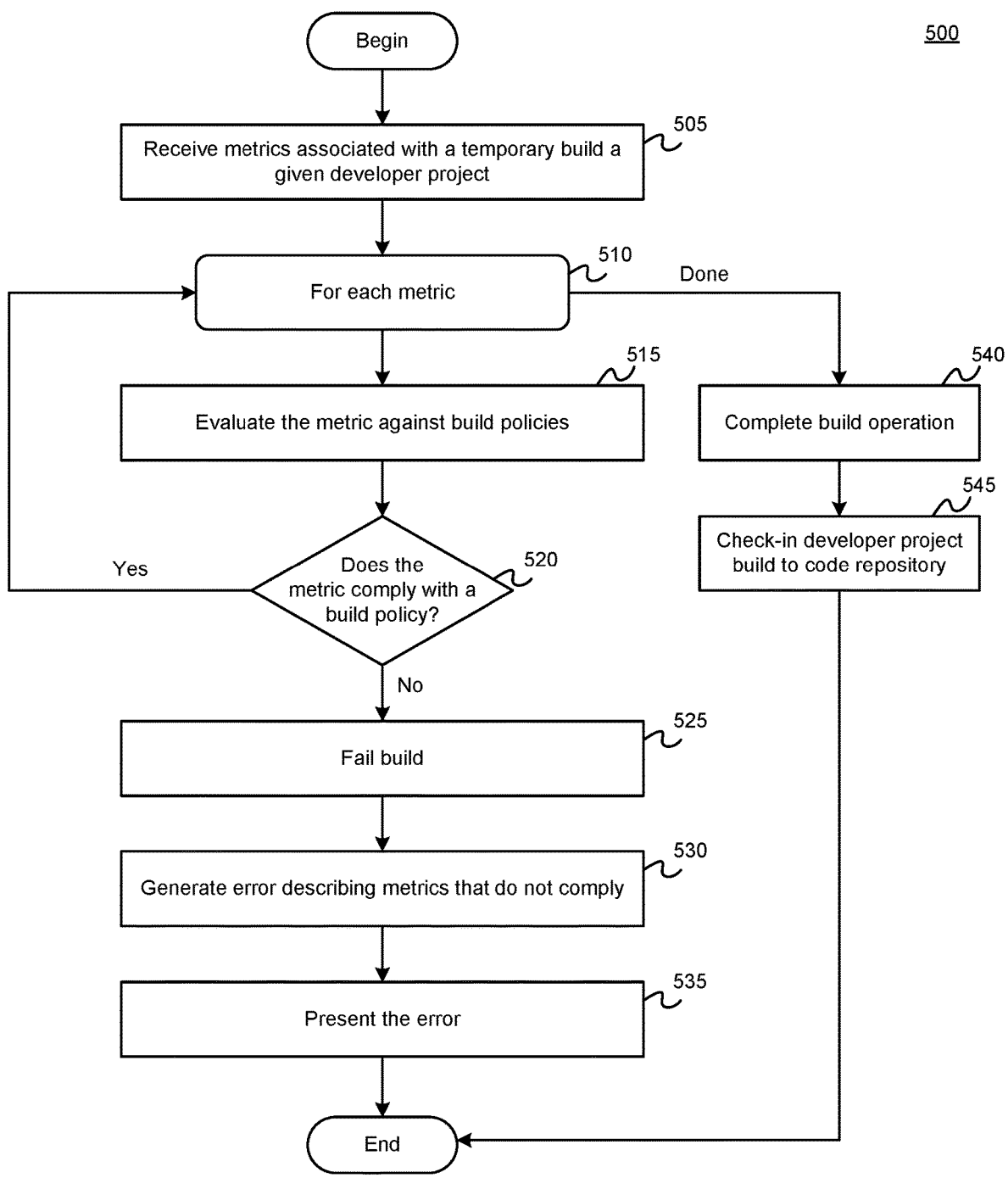
FIG. 5 illustrates a method for enforcing policies on a development build based on collected metrics associated with the build, according to one embodiment.

FIG. 5 illustrates a method 500 for enforcing build policies based on metrics obtained for a software build of a developer project, according to one embodiment. As shown, method 500 begins at step 505, where the analysis engine 112 receives metrics for a given developer project 108. The metrics may be sent to the analysis engine 112 as a package of individual metrics for the developer project 108, each metric data including a unique identifier, timestamp, and description.

At step 510, the method 500 enters a loop for each build metric that includes steps 515 and 520. At step 515, the analysis engine 112 evaluates the build metric against one or more of the build policies 123. For example, a build policy 123 might specify that load times between a first page to a second page in a user interface provided by a developer project 108 should fall below a specified threshold. Further, the analysis engine 112 may evaluate that metric relative to the build policy 123. At step 520, the analysis engine 112 determines whether the build metric complies with the build policies 123. If so, then the loop returns to step 515.

Otherwise, if the metric does not comply with a build policy 123, then at step 525, the analysis engine 112 generates an indication to fail the build. The analysis engine 112 may send the indication to the decision component 230. In turn, the decision component 230 prevents (e.g., via an API hook) the build from proceeding. Further, at step 530, the decision component 230 generates an error describing the non-compliant metrics. At step 530, the notification component 210 presents the error, e.g., via a user interface on the IDE tool 106.

In the event that the loop at step 510 ends without any issues of non-compliant metrics, then at step 540, the shared build module 107 completes the build operation. At step 545, the shared build module 107 checks-in the developer project build to the code repository service 121.

Figure 6:
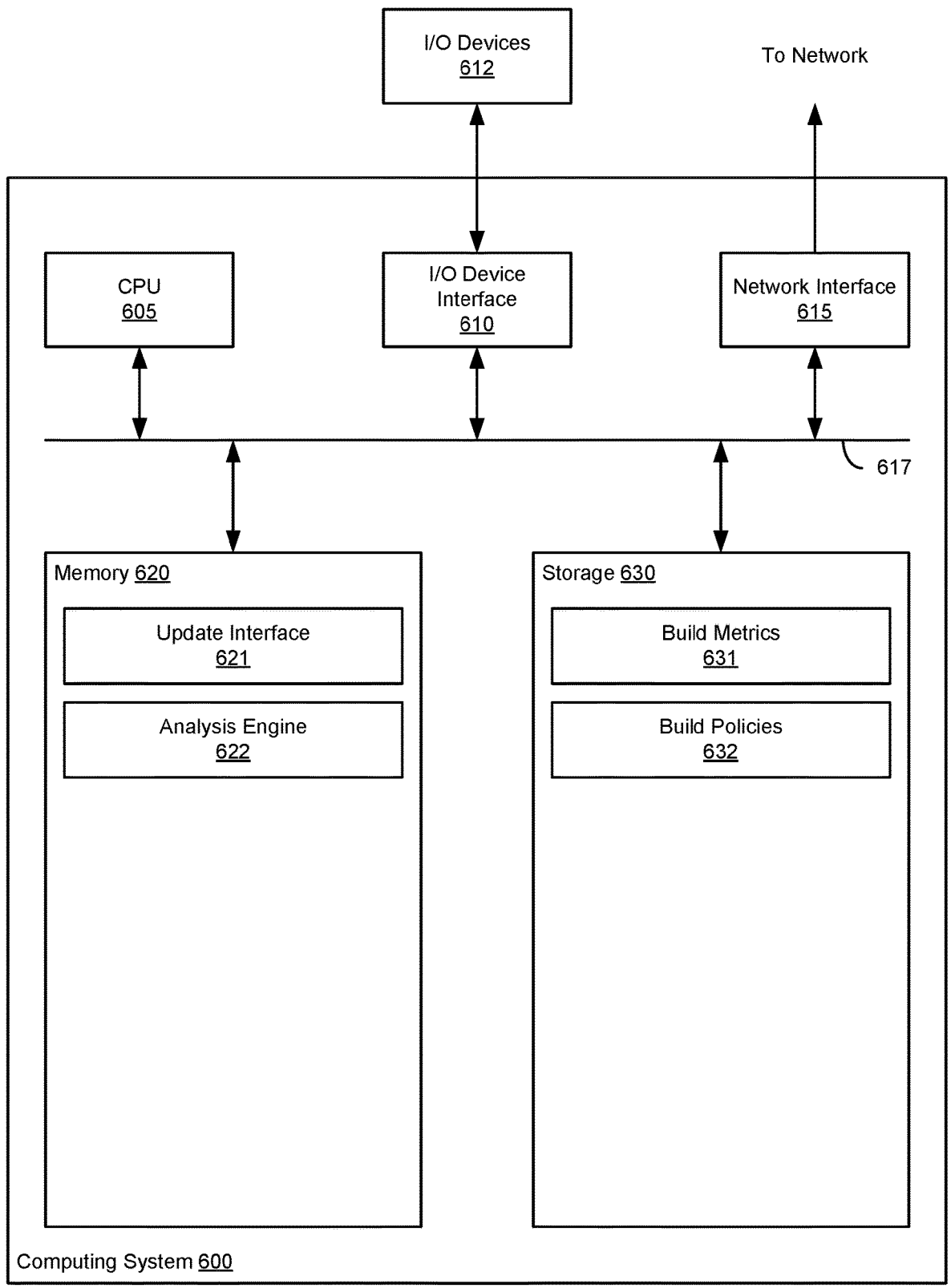
FIG. 6 illustrates an example computing system configured to analyze metrics collected from a variety of developer project builds, according to one embodiment.

FIG. 6 illustrates an example computing system 600 configured to analyze metrics collected from a variety of developer project builds, according to an embodiment. As shown, the computing system 600 includes, without limitation, a central processing unit (CPU) 605, an I/O device interface 610, which may allow for the connection of various I/O devices 612 (e.g., keyboards, displays, mouse devices, pen input, etc.) to the computing system 600, a network interface 615, a memory 620, storage 630, and an interconnect 617.

CPU 605 may retrieve and execute programming instructions stored in the memory 620. Similarly, the CPU 605 may retrieve and store application data residing in the memory 620. The interconnect 617 transmits programming instructions and application data, among the CPU 605, I/O device interface 610, network interface 615, memory 620, and storage 630. CPU 605 is included to be representative of a single CPU, multiple CPUs, a single CPU having multiple processing cores, and the like.

Additionally, the memory 620 is included to be representative of a random access memory. Furthermore, the storage 630 may be a solid state or disk drive. Although shown as a single unit, the storage 630 may be a combination of fixed and/or removable storage devices, such as fixed disc drives, removable memory cards or optical storage, network attached storage (NAS), or a storage area-network (SAN). In some cases, computing system 600 may be a single physical system or a distributed system, such as in one or more computer systems or data centers, with processing capabilities, memory 620, and storage 630 distributed across multiple computer systems.

As shown, memory 620 includes an update interface 621 and an analysis engine 622. Storage 630 includes one or more build metrics 631 and build policies 632. In one embodiment the update interface 621 commits updates from a shared build module through a code repository service. The analysis engine 622 receives build metrics 631 for a developer project created from a developer system. The analysis engine 622 may evaluate each of the build metrics 631 against the build policies 632 to determine whether the build metric 631 complies with the build policies 632. The analysis engine 622 may generate an indication to prevent a build from completing (e.g., from being checked-in to a code repository) and send the indication to a shared build module of a developer system associated with the developer project. In turn, the shared build module may (e.g., via an API hook) block an ongoing build process from proceeding.

Figure 7:
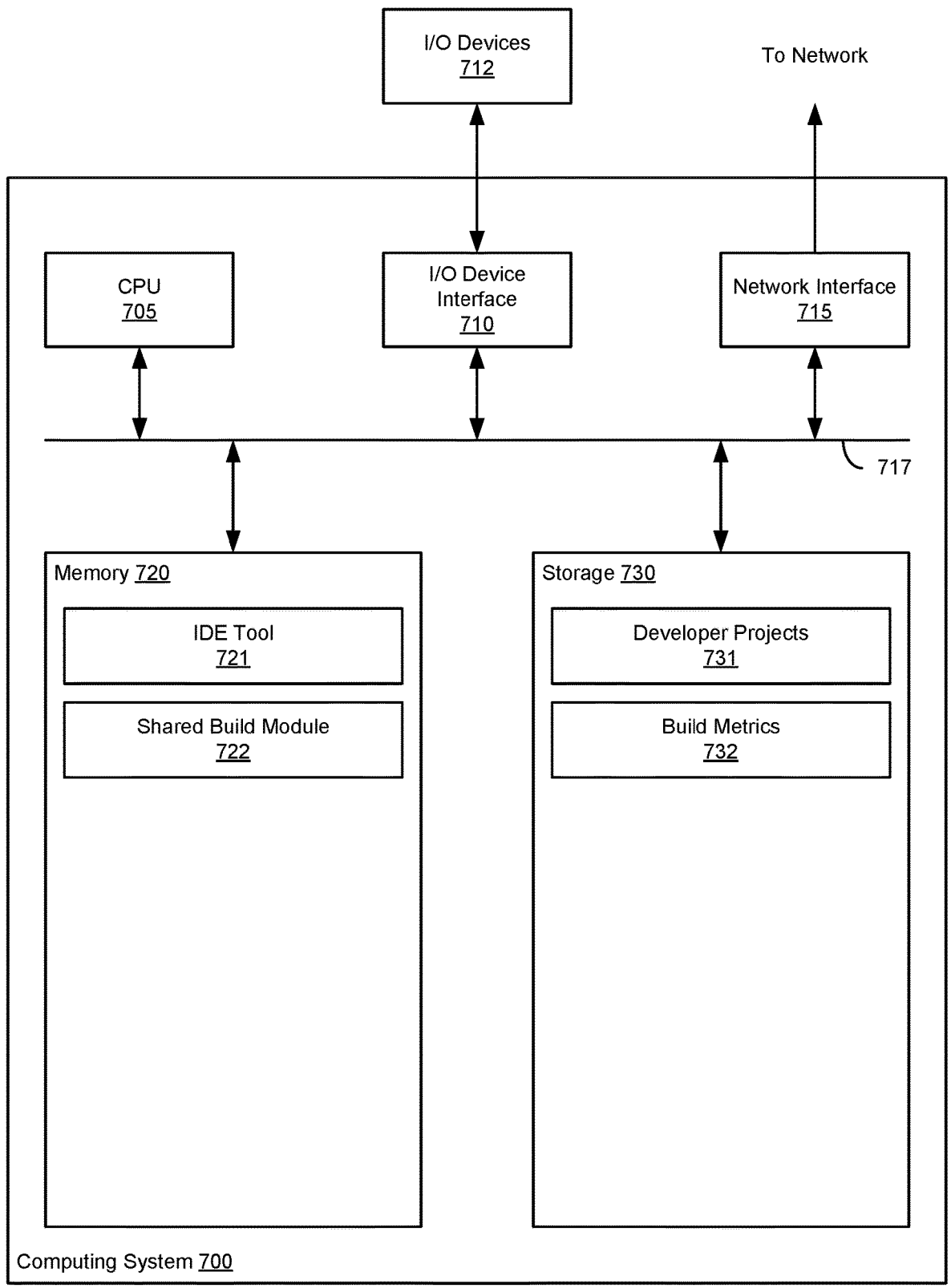
FIG. 7 illustrates an example computing system configured with a build module shared across a variety of developer projects, according to one embodiment.

FIG. 7 illustrates an example computing system 700 configured with a build module shared across a variety of developer projects, according to one embodiment. As shown, the computing system 700 includes, without limitation, a central processing unit (CPU) 705, an I/O device interface 710, which may allow for the connection of various I/O devices 712 (e.g., keyboards, displays, mouse devices, pen input, etc.) to the system 712, network interface 715, a memory 720, storage 730, and an interconnect 717.

CPU 705 may retrieve and execute programming instructions stored in the memory 720. Similarly, the CPU 705 may retrieve and store application data residing in the memory 720. The interconnect 717 transmits programming instructions and application data, among the CPU 705, I/O device interface 710, network interface 715, memory 720, and storage 730. CPU 705 is included to be representative of a single CPU, multiple CPUs, a single CPU having multiple processing cores, and the like.

Additionally, the memory 720 is included to be representative of a random access memory. Furthermore, the storage 730 may be a solid state or disk drive. Although shown as a single unit, the storage 730 may be a combination of fixed and/or removable storage devices, such as fixed disc drives, removable memory cards or optical storage, network attached storage (NAS), or a storage area-network (SAN). In some cases, the computing system 700 may be a single physical system or a distributed system, such as in one or more computer systems or data centers, with processing capabilities, memory 720, and storage 730 distributed across multiple computer systems.

As shown, memory 720 includes an integrated development environment (IDE) tool 721 and a shared build module 722. And the storage 730 includes one or more developer projects 731 and build metrics 732. The IDE tool 721 provides a source code editing interface and an interface used to invoke the shared build module 722. The shared build module 722 provides scripts, utilities, and configurations that may be common to many application development teams. For example, the shared build module 722 may include scripts for building (e.g., compiling and linking) a developer project, configuring test servers (e.g., for debug purposes), executing tests on the compiled developer project 108 (e.g., unit testing), etc. In one embodiment, the shared build module 722 collects metrics at various stages of a build process for a given developer project. The shared build module 822 may then send the collected metrics for evaluation by an analysis engine on a management server. The analysis engine may evaluate the build metrics against build policies to enforce, e.g., quality measures, and send indications to the shared build module 822 specifying whether to prevent a build from completion.

In the preceding, reference is made to embodiments of the present disclosure. However, the present disclosure is not limited to specific described embodiments. Instead, any combination of the following features and elements, whether related to different embodiments or not, is contemplated to implement and practice the techniques presented herein.

Furthermore, although embodiments of the present disclosure may achieve advantages over other possible solutions and/or over the prior art, whether or not a particular advantage is achieved by a given embodiment is not limiting of the present disclosure. Thus, the following aspects, features, embodiments and advantages are merely illustrative and are not considered elements or limitations of the appended claims except where explicitly recited in a claim(s).

Aspects presented herein may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments presented herein. In this regard, each block in the flowchart or block diagrams may represent a module, segment or portion of code, which comprises one or more executable instructions for implementing the specified logical function(s). In some alternative implementations the functions noted in the block may occur out of the order noted in the figures.

For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Embodiments presented herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for enforcing build policies across a plurality of software development projects, the method comprising:
   receiving, by a shared build module that is common to a plurality of software development projects, from a user, a rule for whether to allow a build process to proceed, wherein:
      the rule is applicable to the plurality of software development projects, and
      the rule relates to whether a given software development project of the plurality of software development projects involves a blacklisted application programming interface (API);
   collecting, by the shared build module, a first metric of a plurality of metrics during a first stage of a plurality of stages in the build process for a project build of a respective software development project of the plurality of software development projects, wherein the collecting comprises:
      performing a scanning procedure, by a first script of the shared build module; and
      evaluating, by the shared build module, based on the scanning procedure, source code files of the respective software development project to identify one or more API calls;
   evaluating, by the shared build module, the first metric against the rule by determining whether each respective API call of the one or more identified API calls involves the blacklisted API;
   determining, by the shared build module, that the first metric does not comply with the rule; and
   in response to the determining that the first metric does not comply with the rule:
      aborting, by the shared build module, the project build at the first stage of the build process;
      blocking, by the shared build module, via an API hook that was set by the shared build module in the first stage of the build process, the project build from being deployed to a repository, wherein:
         the repository is common to the plurality of software development projects, the API hook is one of a plurality of API hooks, and each respective API hook of the plurality of API hooks was set by the shared build module in a respective stage of the plurality of stages;

generating an error notification indicating that the project build was aborted; and providing the error notification to the user.

2. The method of claim 1, wherein the error notification indicates the first metric that does not comply with the rule.

3. The method of claim 1, wherein the plurality of metrics is collected from one or more automated tests on a temporary build of the respective software development project.

4. The method of claim 3, wherein the plurality of metrics includes at least one of a measure of code coverage of the respective software development project, an execution time of at least one of the one or more automated tests, or comment description coverage.

5. The method of claim 1, wherein the plurality of metrics is collected based on libraries of the respective software development project.

6. The method of claim 1, wherein the plurality of metrics includes a listing of APIs used in the source code files.

7. The method of claim 1, wherein the shared build module includes at least a plurality of scripts for building and deploying the respective software development project for use with a software platform.

8. A system, comprising:
a processor; and
a memory storing instructions, which, when executed by the processor, cause the system to perform a method for enforcing build policies across a plurality of software development projects, the method comprising:
receiving, by a shared build module that is common to a plurality of software development projects, from a user, a rule for whether to allow a build process to proceed, wherein:
the rule is applicable to the plurality of software development projects, and
the rule relates to whether a given software development project of the plurality of software development projects involves a blacklisted application programming interface (API);
collecting, by the shared build module, a first metric of a plurality of metrics during a first stage of a plurality of stages in the build process for a project build of a respective software development project of the plurality of software development projects, wherein the collecting comprises:
performing a scanning procedure, by a first script of the shared build module; and
evaluating, by the shared build module, based on the scanning procedure, source code files of the respective software development project to identify one or more API calls;
evaluating, by the shared build module, the first metric against the rule by determining whether each respective API call of the one or more identified API calls involves the blacklisted API;
determining, by the shared build module, that the first metric does not comply with the rule; and
in response to the determining that the first metric does not comply with the rule:
aborting, by the shared build module, the project build at the first stage of the build process;
blocking, by the shared build module, via an API hook that was set by the shared build module in the first stage of the build process, the project build from being deployed to a repository, wherein:
the repository is common to the plurality of software development projects, the API hook is one of a plurality of API hooks, and each respective API hook of the plurality of API hooks was set by the shared build module in a respective stage of the plurality of stages;

generating an error notification indicating that the project build was aborted; and providing the error notification to the user.

9. The system of claim 8, wherein the error notification indicates the first metric that does not comply with the rule.

10. The system of claim 8, wherein the plurality of metrics is collected from one or more automated tests on a temporary build of the respective software development project.

11. The system of claim 10, wherein the plurality of metrics includes at least one of a measure of code coverage of the respective software development project, an execution time of at least one of the one or more automated tests, or comment description coverage.

12. The system of claim 8, wherein the plurality of metrics is collected based on libraries of the respective software development project.

13. The system of claim 8, wherein the plurality of metrics includes a listing of APIs used in the source code files.

14. The system of claim 8, wherein the shared build module includes at least a plurality of scripts for building and deploying the respective software development project for use with a software platform.

15. A computer-implemented method for enforcing build policies across a plurality of software development projects, the method comprising:
receiving, by a shared build module that is common to a plurality of software development projects, from a user, a rule for whether to allow a build process to proceed, wherein:
the rule is applicable to the plurality of software development projects, and
the rule relates to whether a given software development project of the plurality of software development projects involves a blacklisted library;
collecting, by the shared build module, a first metric of a plurality of metrics during a first stage of a plurality of stages in the build process for a project build of a respective software development project of the plurality of software development projects, wherein the collecting comprises:
performing a scanning procedure, by a first script of the shared build module; and
evaluating, by the shared build module, based on the scanning procedure, source code files of the software development project to identify one or more libraries to determine the first metric;
evaluating, by the shared build module, the first metric against the rule by determining whether each respective library of the one or more identified libraries involves the blacklisted library;
determining, by the shared build module, that the first metric does not comply with the rule; and
in response to the determining that the first metric does not comply with the rule:
aborting, by the shared build module, the project build at the first stage of the build process;
blocking, by the shared build module, via an API hook that was set by the shared build module in the first stage of the build process, the project build from being deployed to a repository, wherein:
the repository is common to the plurality of software development projects, the API hook is one of a plurality of API hooks, and each respective API hook of the plurality of API hooks was set by the shared build module in a respective stage of the plurality of stages;

generating an error notification indicating that the project build was aborted; and providing the error notification to the user.

16. The method of claim 15, wherein the error notification indicates the first metric that does not comply with the rule.

17. The method of claim 15, wherein the plurality of metrics is collected from one or more automated tests on a temporary build of the respective software development project.

18. The method of claim 17, wherein the plurality of metrics includes at least one of a measure of code coverage of the respective software development project, an execution time of at least one of the one or more automated tests, or comment description coverage.

19. The method of claim 15, wherein the plurality of metrics includes a listing of libraries used in the source code files.

20. The method of claim 15, wherein the plurality of metrics includes a listing of APIs used in the source code files.

* * * * *